United States Patent [19]

Mancuso

[11] Patent Number: 5,404,839

[45] Date of Patent: Apr. 11, 1995

[54] TERRARIUM

[75] Inventor: Robert Mancuso, West Hills, Calif.

[73] Assignee: Mancuso's Exotic Tropical Fish, Inc., Van Nuys, Calif.

[21] Appl. No.: 181,338

[22] Filed: Jan. 14, 1994

[51] Int. Cl.⁶ .............................................. A01K 63/00
[52] U.S. Cl. .................... 119/246; 119/269; 47/69
[58] Field of Search .............. 119/246, 265, 269; 47/69

[56] References Cited

U.S. PATENT DOCUMENTS

| | | |
|---|---|---|
| D. 233,938 | 12/1974 | Shalom . |
| D. 236,632 | 9/1975 | Shalom . |
| D. 236,633 | 9/1975 | Shalom . |
| D. 236,634 | 9/1975 | Shalom . |
| D. 238,688 | 2/1976 | Shalom . |
| 2,715,794 | 8/1955 | Atkinson ............................ 47/69 X |
| 3,152,574 | 10/1964 | Stout . |
| 3,738,319 | 6/1973 | Dinnerstein ........................ 119/269 |
| 3,759,223 | 9/1973 | D'Andrea . |
| 3,759,224 | 9/1973 | Hall . |
| 3,786,781 | 1/1974 | Poulsen ............................... 119/246 |
| 4,576,115 | 3/1986 | Gordon . |
| 4,958,593 | 9/1990 | Hurlburt et al. . |
| 4,967,694 | 11/1990 | Waldman .............................. 47/69 X |
| 5,010,845 | 4/1991 | Azpurua et al. ..................... 119/17 |
| 5,138,976 | 8/1992 | Gordon ................................ 119/265 |

*Primary Examiner*—Robert P. Swiatek
*Attorney, Agent, or Firm*—Fulwider Patton Lee & Utecht

[57] ABSTRACT

The terrarium includes at least one glass sidewall serving as a viewing window, and a chassis formed of rigid plastic providing a bottom wall and a rear side wall. In one embodiment, the chassis includes a bottom channel formed in the bottom wall of the chassis, for mounting the glass viewing wall. In another embodiment, the glass wall is mounted to the chassis by a plastic frame member bonded to the plastic sidewalls of the chassis. The terrarium also includes a top screened closure member. In one embodiment, a channel for the closure member is formed in the upper portions of the sidewalls of the chassis, and in another embodiment, a channel for the closure member is provided by opposing F-shaped molding members fitted over opposing glass sidewalls of the terrarium.

17 Claims, 4 Drawing Sheets

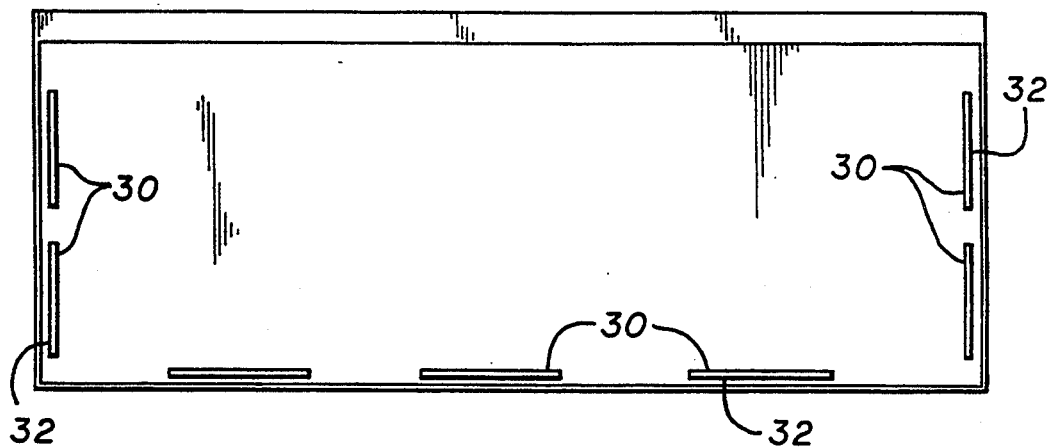
FIG. 3
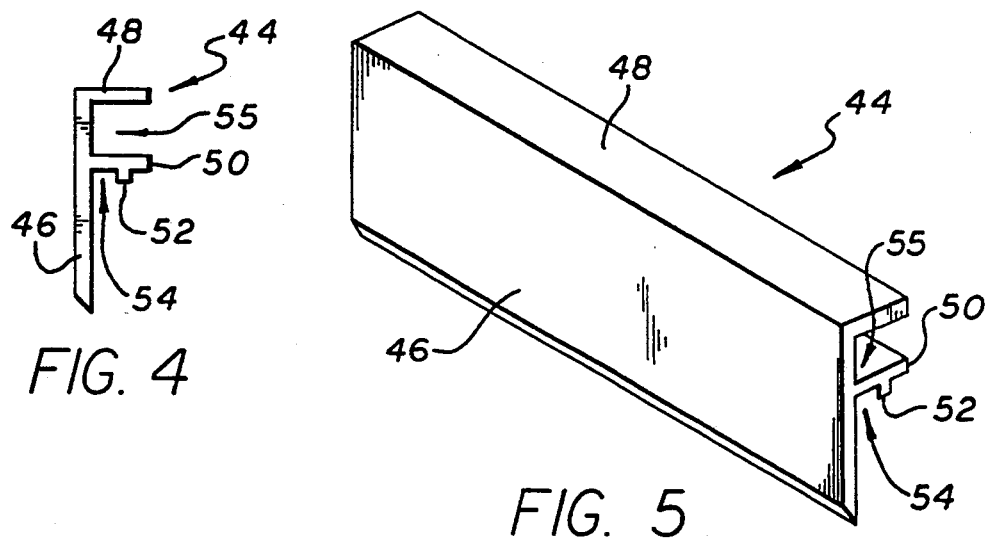
FIG. 4
FIG. 5
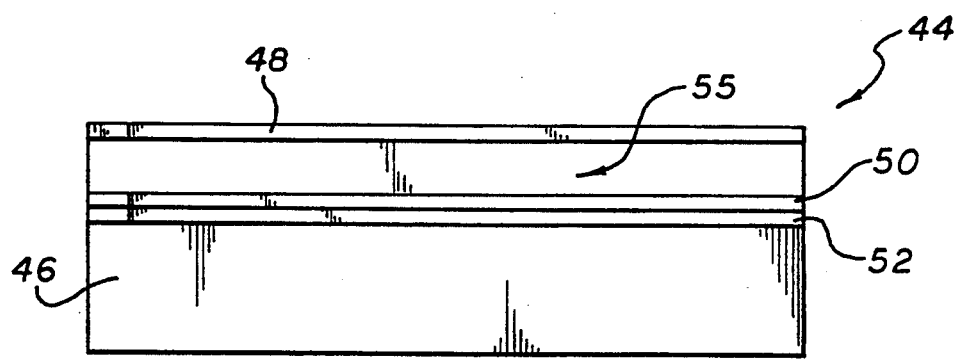
FIG. 6

TERRARIUM

BACKGROUND OF THE INVENTION

1. Field of the Invention

This invention relates generally to terrariums, and more specifically relates to terrariums having glass and plastic walls, suitable for keeping, raising and observing reptiles.

2. Description of Related Art

Conventional reptile terrariums or tanks are typically made with glass walls, because it has been found that clear plastic walls generally can be scratched too easily by the reptiles, which can seriously mar the walls of the terrarium and obscure a clear view of the reptiles within a few months of use. Glass walls are not so easily scratched by reptiles, but are more breakable than plastic walls. The use of plastic walls can also simplify the process of manufacturing such reptile terrariums, so that it would be desirable to provide a reptile terrarium that incorporates plastic walls that would simplify the manufacturing process and would reduce the fragility of the terrarium, and that would provide at least one glass viewing window that would resist being scratched and marred by reptiles in the terrarium.

Unfortunately, it has been found that with existing adhesives, it is difficult to glue plastic to glass with a sufficient bonding strength suitable for providing both glass and plastic walls in a reptile terrarium. It would therefore be desirable to provide a terrarium having a plastic frame which provides plastic walls and retains at least one glass viewing wall without the need for an adhesive bond between the glass and the plastic frame. The present invention meets these needs.

SUMMARY OF THE INVENTION

Briefly and in general terms, the present invention provides for a terrarium having at least one glass sidewall serving as a viewing window for the terrarium, and a chassis formed of rigid plastic providing at least a bottom wall and a rear side wall. In one embodiment, a bottom channel for retaining a glass wall is formed in the bottom wall of the chassis. In another embodiment, the glass wall is mounted to the front of the chassis by a frame member bonded to the sidewalls of the chassis, and having a recess for the glass wall between the frame member and the sidewalls of the chassis. The terrarium also preferably includes a top screened closure member slidably received in an upper channel of the terrarium. In one embodiment, the upper channel is formed in the upper portions of the sidewalls of the chassis, and in another embodiment, opposing F-shaped molding members are fitted over opposing sidewalls of the terrarium to provide side channels for the top screened closure member.

These and other aspects and advantages of the invention will become apparent from the following detailed description, and the accompanying drawings, which illustrate by way of example the features of the invention.

BRIEF DESCRIPTION OF THE DRAWINGS

FIG. 3 is a top plan view of the chassis of FIG. 2;

FIG. 4 is an end view of an F-molding member of the terrarium of FIG. 1;

FIG. 5 is a perspective view of an F-molding member of the terrarium of FIG. 1;

FIG. 6 is a side view of an F-molding member of FIG. 1;

DETAILED DESCRIPTION OF THE PREFERRED EMBODIMENTS

Glass terrariums, which are particularly suitable for reptiles because they are not easily scratched, are undesirably fragile, while terrariums with clear plastic viewing walls have been found to be subject to an accumulation of numerous scratches that make it difficult to see through the viewing wall. The present invention incorporates a glass viewing wall for good visibility and a plastic frame or chassis for improved durability of the terrarium, without adhesively bonding the glass directly to the plastic frame.

Figure 1:
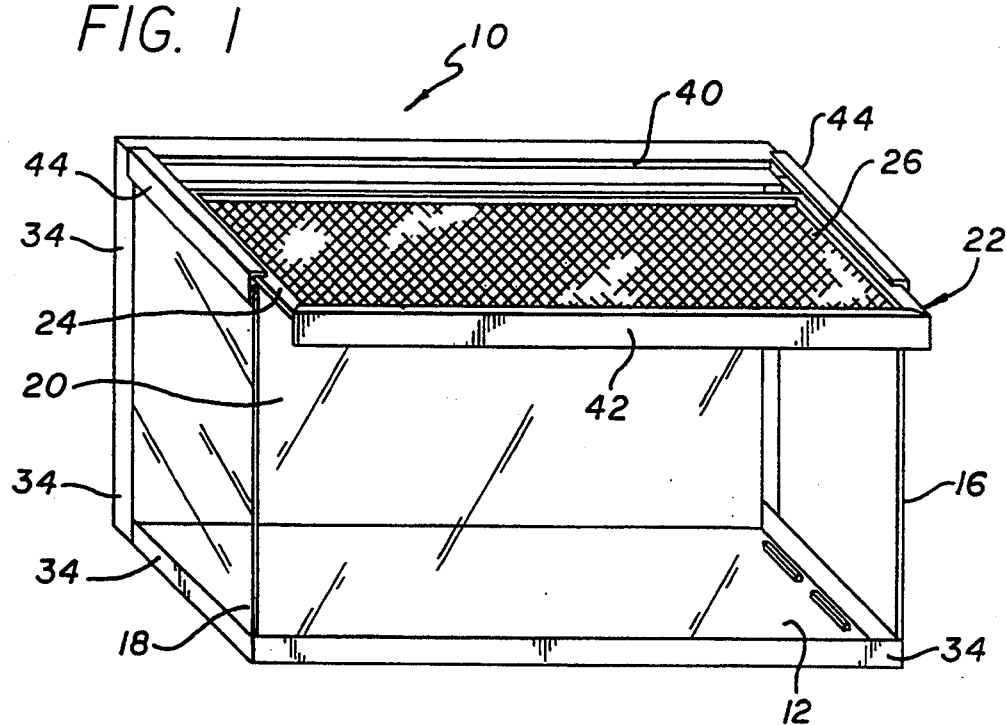
FIG. 1 is a front perspective view of a terrarium according to the principles of the invention.

Accordingly, with reference to FIG. 1, in one preferred embodiment the present invention provides for a terrarium 10, having a bottom wall 12, a rear side wall 14, a glass left side wall 16, a glass right side wall 18, and a glass front side wall 20. The glass side walls are preferably bonded together at their edges where they meet by a suitable adhesive such as silicone. The terrarium preferably includes a sliding top screened closure member 22, having a frame 24, typically made of metal angle members or a bent angle member formed in the shape of rectangular tubing such as light aluminum or stainless steel, and the like. A screen mesh 26 allowing for air circulation in the terrarium and of sufficient strength to contain reptiles in the terrarium is fastened to the frame 24, by an adhesive such as hot glue, welding, or similar methods well known in the art.

Figure 2:
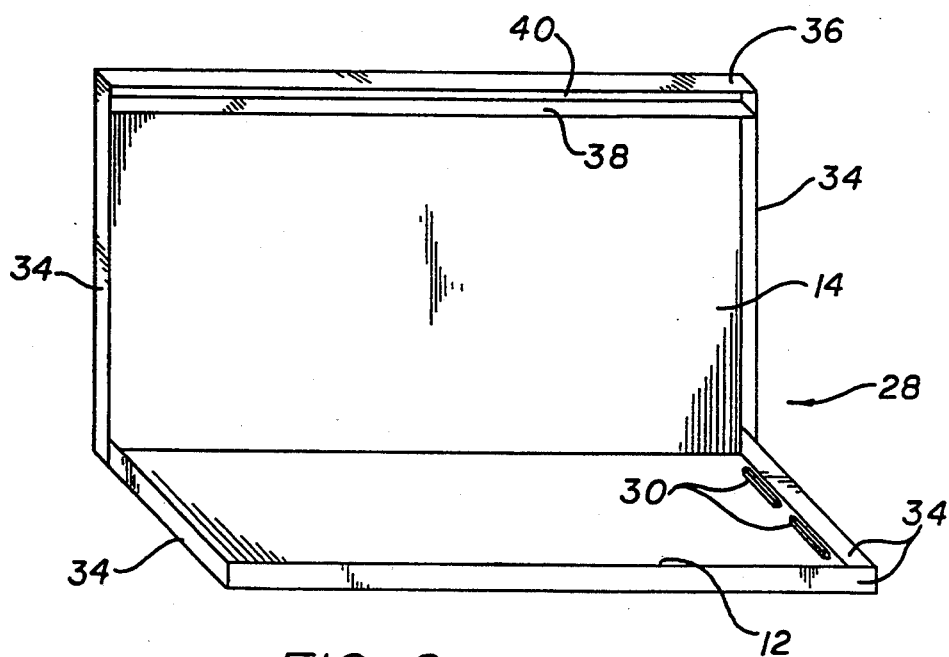
FIG. 2 is a front perspective view of the chassis of the terrarium of FIG. 1.

Referring to FIGS. 1-3, the terrarium includes a unitary chassis 28 formed of rigid plastic. The chassis is currently preferably formed of poly (methylmethacrylate) type polymers, commonly sold under the trademark "PLEXIGLAS" and available from Rohm & Haas Company. The chassis may also be formed of other plastics, such as polyethylene, polypropylene, polyvinyl chloride, polycarbonate, and other similar thermoplastic materials. The chassis can typically be formed by injection—blow molding or other similar techniques. Suitable thermoset plastics or other durable materials may also be used to form the chassis.

The bottom wall 12 of the chassis 28 also preferably includes a bottom channel 32 formed between one or more inner ridges 30 and a strip of outer side molding 34 along the edges of the bottom wall for retaining a pane of glass. The bottom channel may also be formed as a groove in the bottom wall. A similar channel for the glass may also be formed along the edges of the rear side wall 14 adjacent to the outer side molding 34 of the rear side wall. The rear side wall 14 also preferably includes a strip of upper rear side molding 36 contiguous with the side molding 34 of the rear wall, and a parallel rear shelf 38 adjacent to the upper rear side molding 36 and extending between the side moldings 34 of the rear side wall, to provide an upper channel 40 for receiving a rear edge of the top screened closure member.

Figure 7:
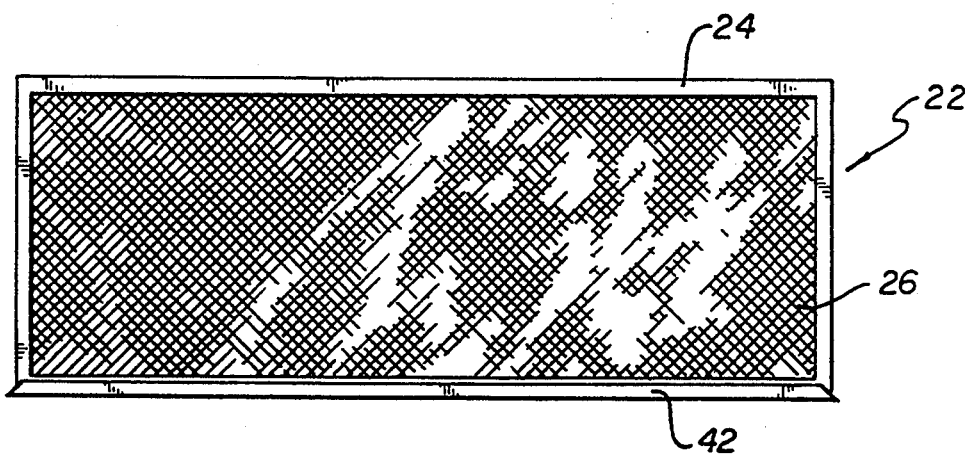
FIG. 7 is a top plan view of the top screened closure member of the terrarium of FIG. 1.

The top screened closure member 22 also preferably includes a front molding 4,2, shown in FIGS. 1 and 7, extending across a front side of the frame for the screen, to cover the top of the front glass viewing wall 20 and to meet at its edges with opposing side F-molding members 44, shown in FIGS. 1 and 4–6. Each F-molding member 44 is formed generally in the shape of the letter "F" and includes a broad side 46, a top angle portion 48 extending at right angles from the top edge of the side 46, and a shelf member 50 extending at right angles from a mid-portion of the side 46 adjacent to the top angle portion 48 forming a side channel 55 for receiving the top screened closure member. The bottom side of the shelf member 50 also includes a lower flange 52 spaced apart from the side portion 46. The F-molding member thus provides for a slot 54 between the lower flange 52 and the side portion 46 to receive an upper portion of a glass sidewall, allowing the F-molding member to be tightly mounted over the top of a glass side wall. Alternatively, the top screened closure member can be suitably hinged to the rear wall of the chassis, to rest on the side and front walls in a closed position.

Figure 12:
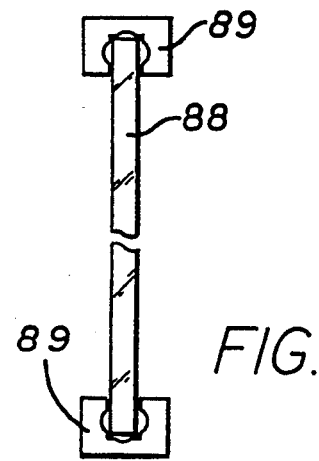
FIG. 12 is a cross-sectional view of the front glass viewing wall and retaining frame of the terrarium of FIG. 8.

As is illustrated in FIGS. 18–12, in a second preferred embodiment of the terrarium of the invention, the terrarium 60 includes a bottom wall 62, rear side wall 64, left side wall 66, and right side wall 68, and a glass front side wall 70. The terrarium includes a top screened closure member 72, having a frame 74 and screen 76 mounted to the frame 74 as in the first embodiment.

Figure 9:
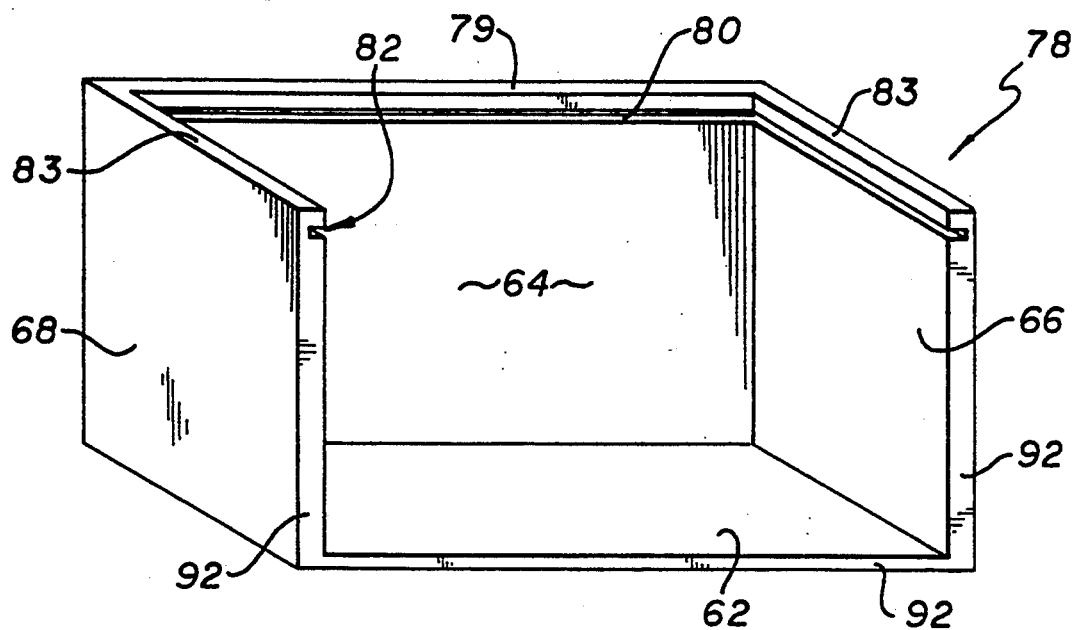
FIG. 9 is a front perspective view of the chassis of the terrarium of FIG. 8.

As can be best seen in FIG. 9, the bottom, rear, left and right side walls of the terrarium of the second embodiment are formed by the unitary chassis 78, preferably formed of rigid plastic. The chassis is currently preferably formed of "Plexiglas," such as by injection-blow molding, but can also be formed of other appropriate thermoplastic materials, such as polyethylene, polypropylene, polyvinyl chloride, polycarbonate, thermoset plastics, and the like.

Figure 10:
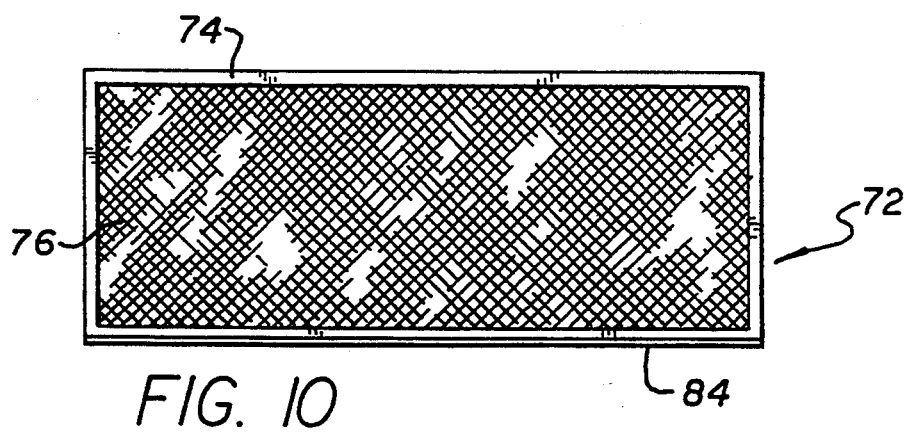
FIG. 10 is a top plan view of the top screened closure member of the terrarium of FIG. 8.

The upper portion of the rear side wall of the chassis preferably includes an inner channel 80 spaced apart from and parallel to the top edge 79 of the rear wall, for receiving the rear edge of the top screen closure member. The upper portions of the left and right side wall members also preferably include inner side channels 82 spaced apart from and parallel to the top edges 83 of the side walls for slidably receiving the top screen closure member. The top screen closure member shown in FIGS. 8 and 10 also preferably includes a front molding 84, for sealing a space above the front frame 86 for the front glass viewing window 88 when the top screened closure member is fully introduced into the side and rear channels of the chassis. The top screened closure member can alternatively be hinged to one of the side walls of the chassis, to rest upon the front and other side walls in a closed position.

Figure 8:
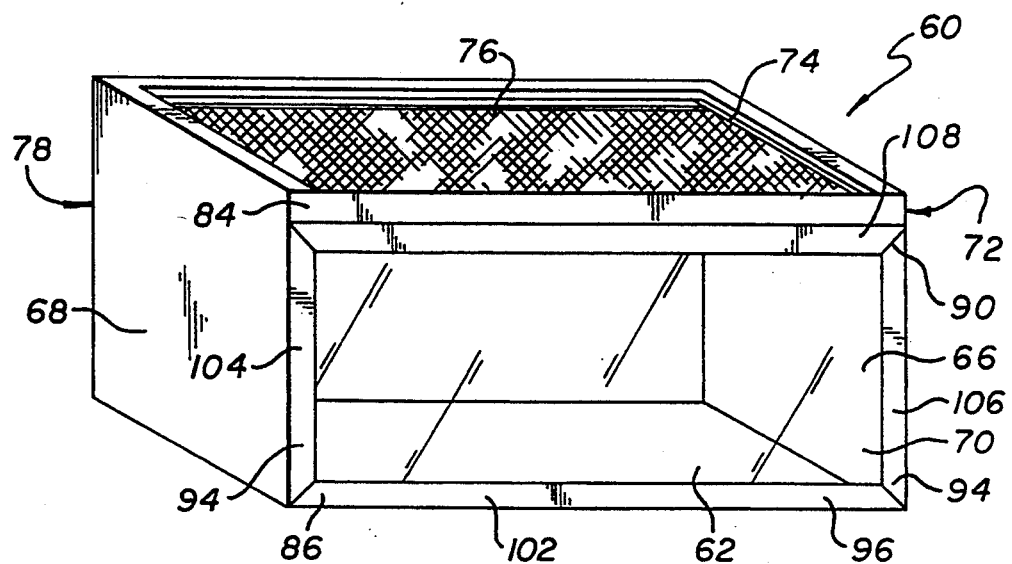
FIG. 8 is a front perspective view of a second embodiment of a terrarium according to the principles of the invention.

As is illustrated in FIG. 8, the front frame 86 for the front viewing glass window 88 is preferably rectangular in shape, being formed from U-shaped longitudinal segments 89 having angled ends 90 and a U-shaped channel 91 for receiving the glass window.

The front frame 86 is preferably formed of the same type of material as the chassis, and is preferably adhesively bonded to the front side and bottom edges of the chassis 92 along the side edges 94 and the bottom edge 96 of the front frame. Typical adhesives which can be used in bonding the front plastic frame member to the plastic chassis are cyanoacrylate adhesives, epoxies, acrylic adhesives, and other similar thermosetting adhesives. Hot glue is the currently preferred adhesive for bonding the front frame member and chassis together. The front frame can also be welded or heat bonded to the chassis.

Figure 11:
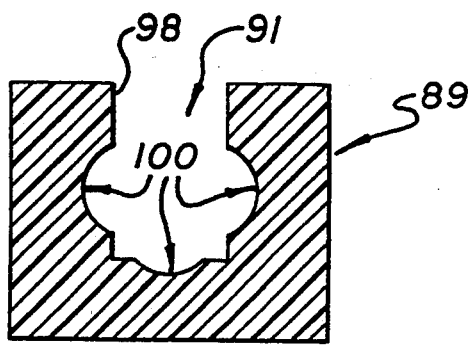
FIG. 11 is a cross-sectional view of a U-shaped segment of the front glass and retaining frame of the terrarium of FIG. 8.

With reference to FIGS. 8, 11 and 12, the inside surfaces 98 of the U-shaped channel segments preferably include arc-shaped notches 100. In constructing the front frame and viewing window, bottom segment 102 and two side segments 104 and 106 are glued together typically with hot glue at their angled corner ends. A thin bead of silicone is placed in the U-shaped channels of the three joined segments, and the glass is then inserted in the U-shaped channel of the joined segments. As the glass pane is inserted, the silicone in the U-shaped channel adheres to the glass and is displaced into the arc shaped slots, forming corresponding arc-shaped ridges, strongly securing the glass within the frame. A bead of silicone is then also placed in the channel of the top segment 108 of the frame, and the top segment is similarly placed over the top portion of the glass pane and glued with hot glue to the exposed side corners of the frame to complete the front frame.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A terrarium comprising:
   a unitary chassis formed of rigid plastic providing a bottom wall and at least one side wall;
   at least one glass viewing wall mounted to said chassis;
   means for mounting said at least one glass viewing wall on said chassis;
   a top screened closure member; and
   means for mounting said top screened closure member to said chassis provided in an upper portion of said at least one side wall.

2. The terrarium of claim 1, wherein said means for mounting said at least one glass viewing wall comprises a bottom channel formed in said bottom wall for receiving said at least one glass viewing wall.

3. The terrarium of claim 1, wherein said means for mounting said at least one glass viewing wall comprises a frame member formed of rigid plastic and having a surface defining a recess for receiving said at least one glass viewing wall, said frame member being bonded to said chassis.

4. The terrarium of claim 1, wherein said chassis includes a channel formed in said at least one side wall for receiving said at least one glass viewing wall.

5. The terrarium of claim 1, wherein said chassis provides a rear side wall, and said means for mounting said at least one glass viewing wall includes an outer strip of molding formed in said chassis along peripheral edges of the bottom wall and the rear side wall.

6. The terrarium of claim 1, wherein said means for mounting said at least one glass wall comprises an outer side molding formed on the outer edges of the bottom wall, and at least one ridge on said bottom wall adjacent to and spaced apart from said outer side molding to form a channel for said at least one glass viewing wall.

7. The terrarium of claim 1, wherein said terrarium comprises opposing glass side walls mounted on said chassis, and said means for mounting the top screened closure member comprises a pair of opposing F-shaped molding members mounted on a top portion of said opposing glass side walls, said F-shaped molding members having surfaces defining opposing channels for slidably receiving the top screened closure member.

8. A terrarium comprising:
- a chassis formed of rigid plastic providing a bottom wall and at least one side wall;
- at least one glass viewing wall mounted to said chassis;
- means for mounting said at least one glass viewing wall on said chassis, said means for mounting including an outer side molding formed on the outer edges of the bottom wall, and at least one ridge on said bottom wall adjacent to and spaced apart from said outer side molding to form a channel for said at least one glass viewing wall;
- a top screened closure member; and
- means for mounting said top screened closure member to said chassis provided in an upper portion of said at least one side wall.

9. The terrarium of claim 8, wherein said means for mounting said at least one glass viewing wall comprises a bottom channel formed in said bottom wall for receiving said at least one glass viewing wall.

10. The terrarium of claim 8, wherein said chassis includes a channel formed in said at least one side wall for receiving said at least one glass viewing wall.

11. The terrarium of claim 8, wherein said chassis provides a rear side wall, and said means for mounting said at least one glass viewing wall includes an outer strip of molding formed in said chassis along peripheral edges of the bottom wall and the rear side wall.

12. The terrarium of claim 8, wherein said terrarium comprises opposing glass side walls mounted on said chassis, and said means for mounting the top screened closure member comprises a pair of opposing F-shaped molding members mounted on a top portion of said opposing glass side walls, said F-shaped molding members having surfaces defining opposing channels for slidably receiving the top screened closure member.

13. A terrarium comprising:
- a chassis formed of rigid plastic providing a bottom wall and at least one side wall;
- opposing glass viewing side walls mounted on said chassis;
- means for mounting said opposing glass viewing side walls on the said chassis;
- a top screened closure member; and
- upper channel means for slidably receiving the top screened closure member, said upper channel means including a pair of opposing F-shaped molding members mounted on a top portion of said opposing glass sidewalls, said F-shaped molding members having surfaces defining opposing channels for slidably receiving the top screened closure member.

14. The terrarium of claim 13, wherein said means for mounting said opposing glass viewing side walls comprises a bottom channel formed in said bottom wall for receiving said opposing glass viewing side walls.

15. The terrarium of claim 13, wherein said chassis includes a channel formed in said at least one side wall for receiving said opposing glass viewing side walls.

16. The terrarium of claim 13, wherein said chassis provides a rear side wall, and said means for mounting said opposing glass viewing side walls includes an outer strip of molding formed in said chassis along peripheral edges of the bottom wall and the rear side wall.

17. The terrarium of claim 13, wherein said means for mounting said opposing glass viewing side walls comprises an outer side molding formed on the outer edges of the bottom wall, and at least one ridge on said bottom wall adjacent to and spaced apart from said outer side molding to form a channel for said opposing glass viewing side walls.

* * * * *